United States Patent [19]

Kuschel

[11] 4,023,021

[45] May 10, 1977

[54] METHOD AND APPARATUS FOR WEIGHING BATCHES OF LIQUID AND OTHER POURABLE SUBSTANCES

[75] Inventor: Konrad Kuschel, Vienna, Austria

[73] Assignee: IFE Gesellschaft mbH, Vienna, Austria

[22] Filed: Apr. 7, 1975

[21] Appl. No.: 566,615

[30] Foreign Application Priority Data

Apr. 8, 1974  Austria .................................. 2935

[52] U.S. Cl. ............................ 235/151.33; 177/60; 235/151.34
[51] Int. Cl.² .................. G01G 17/06; G06F 15/46
[58] Field of Search ................. 235/151.33, 151.34; 177/1, 25, 64, 12, 14, 60

[56] References Cited

UNITED STATES PATENTS

| | | | |
|---|---|---|---|
| 3,225,180 | 12/1965 | Zorena et al. ................. | 235/151.33 |
| 3,828,869 | 8/1974 | Sellers ....................... | 235/151.33 X |
| 3,834,473 | 9/1974 | Girard et al. .............. | 235/151.33 X |
| 3,855,458 | 12/1974 | Motter et al. ................ | 235/151.34 |

Primary Examiner—Edward J. Wise
Attorney, Agent, or Firm—Michael J. Striker

[57] ABSTRACT

During the weighing operation, the change in weight indication is determined according to time value of elapsed time and this value is multiplied with the reduced shutoff time, the negative value thereof being added to the product of the square of the time change and a constant. The intended weight for the batch is added to the algebraic sum of the two values, and the further flow of substance into the receptacle wherein it is being weighed is terminated as soon as the weight indication has reached a summation value.

14 Claims, 2 Drawing Figures

METHOD AND APPARATUS FOR WEIGHING BATCHES OF LIQUID AND OTHER POURABLE SUBSTANCES

BACKGROUND OF THE INVENTION

The present invention relates to a method and an arrangement for weighing batches of liquid and other pourable or flowable substances, particularly in industrial processes requiring high weighing accuracy.

In the weighing methods know from the prior art, the supply of pourable substance to be weighed into the container wherein it is to be weighed is effected by means of supply devices, such as vibratory conveyors, screw conveyors, valves or the like, which have the purpose of maintaining the flow of material to be weighed as uniform as possible. Upon receipt of a signal, the further supply of material to the container is stopped. Prior to reaching of the intended batch weight, the supply of material can already be throttled or a supply device can be used which has a lesser weight of feed, so that the amount of material which enter the receptacle from the supply device, i.e., such amount which issues from the supply device to enter into the receptacle, after the further supply has been shut down, remains small.

The reaction of the material flow (the impulse of the material flow) is factored into the weighing indication. If the material flow is constant, this reaction force can be compensated for only if it is less than the weight which enters into the weighing receptacle after the material shutdown as a result of residual outflow from the feed devices. In the event that the reaction forces exceed this weight value, actual weighing values are obtained upon completion of the inflow of material into the weighing receptacle and after the weighing system has reached equilibrium, which are smaller than the predetermined desired batch value. The exception to this is if the shutoff of the weighing system takes place only at a weight indication which is higher than the desired batch weight.

The aforedescribed influences upon the weighing system may in some cases be maintained within acceptable limits by limiting the maximum material flow and taking into consideration the existence of lead values.

However, very frequently the characteristics of the pourable material are such that the flow of material, that is the entry of material into the receptacle per unit time, is so strongly influenced by the characteristics of the pourable material, for example moisture, viscosity, temperature and the like, and by various other parameters, that it is de facto impossible to maintain the accuracy of the weighing systems within the required limits by setting fixed lead values.

In these cases, it is only possible to carry out a control weighing operation, interrupting the inflow of material before the desired batch weight has been reached, and thereupon to gradually work up to the desired batch weight by metered admission of small quantities of further material.

Such a weighing produces high weight accuracy, as will be readily understood, but it requires significantly more time and in many cases the time for the total weighing operation will be impermissibly long.

SUMMARY OF THE INVENTION

The purpose of the invention is to provide a weighing method wherein the flow of material to be weighed into the weighing container can be substantially increased without decreasing the weighing accuracy, and wherein thereby the time required for the weighing operation can be substantially reduced.

In the following the designations indicated have the meaning explained hereafter:

$g$ gravitational acceleration $\rho$ density of pourable material $f$ cross section of valve opening $v_A$ exit speed (in vertical direction)

$t_F$ drop time of material $t_D$ metering time $t_N$ reduced closing time, so determined that $Q \cdot g \cdot t_N$ equals the lag weight $W_5 \cdot W_5$ is therefore shown as a linear function of $Q$ $Q$ $(f \cdot v_A / V) \rho$ exit quantity/unit time (Dubbel I.S. 297)

$W$ weight indication $W_S$ desired batch weight $W_A$ weight indication at which the flow of material is to be stopped $W_1$ reaction force, which is caused by the flowing material in the feed device upon reaching of the stationary flow state. At the beginning of material discharge this value will be exceeded, because in this phase the flow of air displaced by the pourable material is not yet stabilized so that a pressure back-up develops which deteriorates only upon stabilization of the flow conditions.

$W_2$ weight of that material quantity in free fall which already drops with uniform speed, i.e., which has reached its final free-fall speed. If the weighing container has a large volume, the level in the container rises only slowly so that the drop height remains approximately constant. The diagram (FIG. 1) shows the conditions of the level in the container as constant.

$W_3$ $W_3$ also concerns a component of the reaction force in vertical direction. When the material impinges an inclined container wall the reaction force is less at this point, but the material comes to rest immediately thereafter on the container bottom or at the level of material already present in the container, and the sum of the reaction forces at the container wall and at the material level again corresponds to the value $W_3$.

$W_4$ weight of material which is already present in the container at the time $t$ $W_5$ weight of material which still issues from the feed device until the shutoff becomes effective (lag-time weight). The use of the equation $W_5 = Q \cdot g \cdot t_N$ is based on the assumption that the product corresponds to the weight of the lag-time material quantity.

$t_N$ is not identified with the closing time of the valve and is so selected that the product $Q \cdot g \cdot t_N$ in fact corresponds to the weight of the lag-time material quantity. The values $W_1$ to $W_5$ can be found in accordance with the following equations:

| | | |
|---|---|---|
| $W_1 = Q \cdot (v_A - v_F)$ | range | $\begin{cases} t_D \\ 0 \end{cases}$ |
| $W_2 = Q \cdot g \cdot t$ | range | $\begin{cases} t_F \\ 0 \end{cases}$ |
| $Q \cdot g \cdot t_F$ | range | $\begin{cases} t_D \\ t_F \end{cases}$ |

-continued $$Q \cdot g \cdot [t_F - (t - t_D)] \quad \text{range} \begin{cases} t_D + t_F \\ t_D \end{cases}$$

$$W_3 = Q \cdot v_F \quad \text{range} \begin{cases} t_D + t_F \\ t_F \end{cases}$$

$$W_4 = Q \cdot g(t - t_F) \quad \text{range} \begin{cases} t_D + t_F \\ t_F \end{cases}$$

$$W_5 = Q \cdot g \cdot t_N$$

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
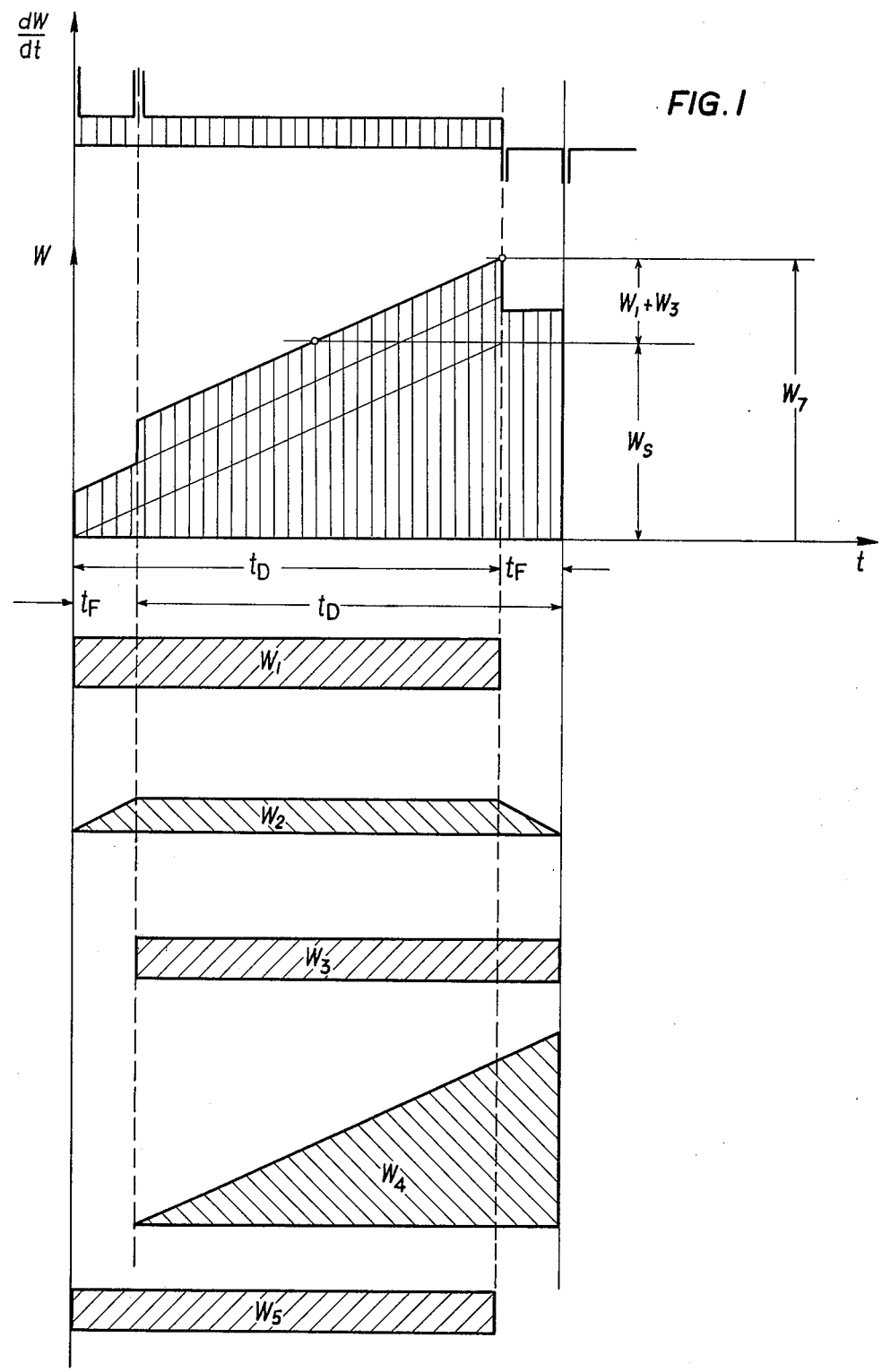
FIG. 1 is a graph illustrating the operation of the method of the invention.

In the method according to the invention, the change in the weighing indication (W) is determined during the weighing operation according to time ($\Delta W/\Delta t$) or ($dW/dt$), this is multiplied with the reduced closing time ($t_N$) the negative of this product has added to it the product derived from the square of the time change ($\Delta W/\Delta t$)$^2$ or ($dW/dt$)$^2$ with the constant $C = (1/f \rho g^2)$ and to the algebraic sum of these two values the intended weight of the charge or batch ($W_s$) is added, and finally the inflow of material is stopped as soon as the weighing indication (W) has reduced the summation value $$W_s + C \left( \frac{\Delta W}{\Delta t} \right)^2 - t_n \left( \frac{\Delta W}{\Delta t} \right)$$

or $$W_s + C \left( \frac{dW}{dt} \right)^2 - t_n \left( \frac{dW}{dt} \right).$$

For purposes of carrying out this method, I provide the inventive arrangement in which a first device $D_1$ serves to determine the time change of the weighing value ($\Delta W/\Delta t$) or ($dW/dt$) and a second device $D_2$ is provided for forming thereof the square ($\Delta W/\Delta t$)$^2$ or ($dW/dt$)$^2$ and wherein a further device $M_1$ is connected to the first device $D_1$ wherein the product of a constant ($t_N$) and the time change for the weighing value is formed. The second device $D_2$ is connected to a device $M_2$ wherein the square of the time change ($\Delta W/\Delta t$)$^2$ or ($dW/dt$)$^2$ is multiplied with the constant (C) and the two multiplying devices are connected to an adder A wherein the sum ($W_A$) of the intended weight ($W_s$), the negative value of the product $t_N(\Delta W/\Delta t)$ or $t_N(dW/dt)$ and the product C($\Delta W/\Delta t$)$^2$ or C($dW/dt$)$^2$ is formed, and in a further device S connected to the adder A the difference is formed between the weighing indication (W) and the sum ($W_A$) and that further a shutoff device V (a valve, a flap or the like) is connected directly or indirectly, e.g., via a signal generator X, which is operated when the difference (W−$W_A$) is reduced to zero.

The meaning of ($dW/dt$) or ($\Delta W/\Delta t$), of ($dW/dt$)$^2$ or ($\Delta W/\Delta t$)$^2$ and of the constant C, as well as of the products $t_N(dW/dt)$ and C($dW/dt$)$^2$, as well as the formation of the formula for $W_A$ is explained in the following:

$$\frac{dW}{dt} = Q \cdot g = f \cdot v_A \cdot \rho \cdot g = (f \cdot \rho \cdot g)v_A \quad \text{range} \begin{cases} t_D \\ t_F \end{cases}$$

$$W_1 + W_3 = Q (v_A - v_F) + Q \cdot v_F = Q \cdot v_A \quad \text{range} \begin{cases} t_D \\ t_F \end{cases}$$

$$W_1 + W_3 = f \cdot v_A^2 \cdot \rho = \frac{1}{f \cdot l} \cdot [(f \cdot \rho)^2 \cdot v_A^2]$$

$$W_1 + W_3 = \frac{1}{f \cdot \rho g} 2 \left( \frac{dW}{dt} \right)^2 = C \cdot \left( \frac{dW}{dt} \right)^2$$

wherein $C = \frac{1}{f \cdot \rho \cdot g} 2$ $$W_5 = Q \cdot g \cdot t_N = \left( \frac{dW}{dt} \right) \cdot t_N$$

The material feed must be shut off at the time $t_D$, at which the weighing indication $W_A$ is determined by the equation $W_A = W_S + W_1 + W_3 - W_5$.

$$W_A = W_S + C(dW/dt)^2 - t_N(dW/dt)$$

The advantages of the inventive method result from the decreased weighing time and the increased weighing accuracy. This is achieved in that the weighing indication is measured at certain time intervals or continuously, its changeover time is calculated and further the varying values, which depend upon the characteristics of the pourable material, are taken into account by the setting of constants. For this purpose the individual forces which occur during the weighing operation are analyzed and their progress over time determined. This is shown in FIG. 1 for the forces ($W_1$) to ($W_5$).

Figure 2:
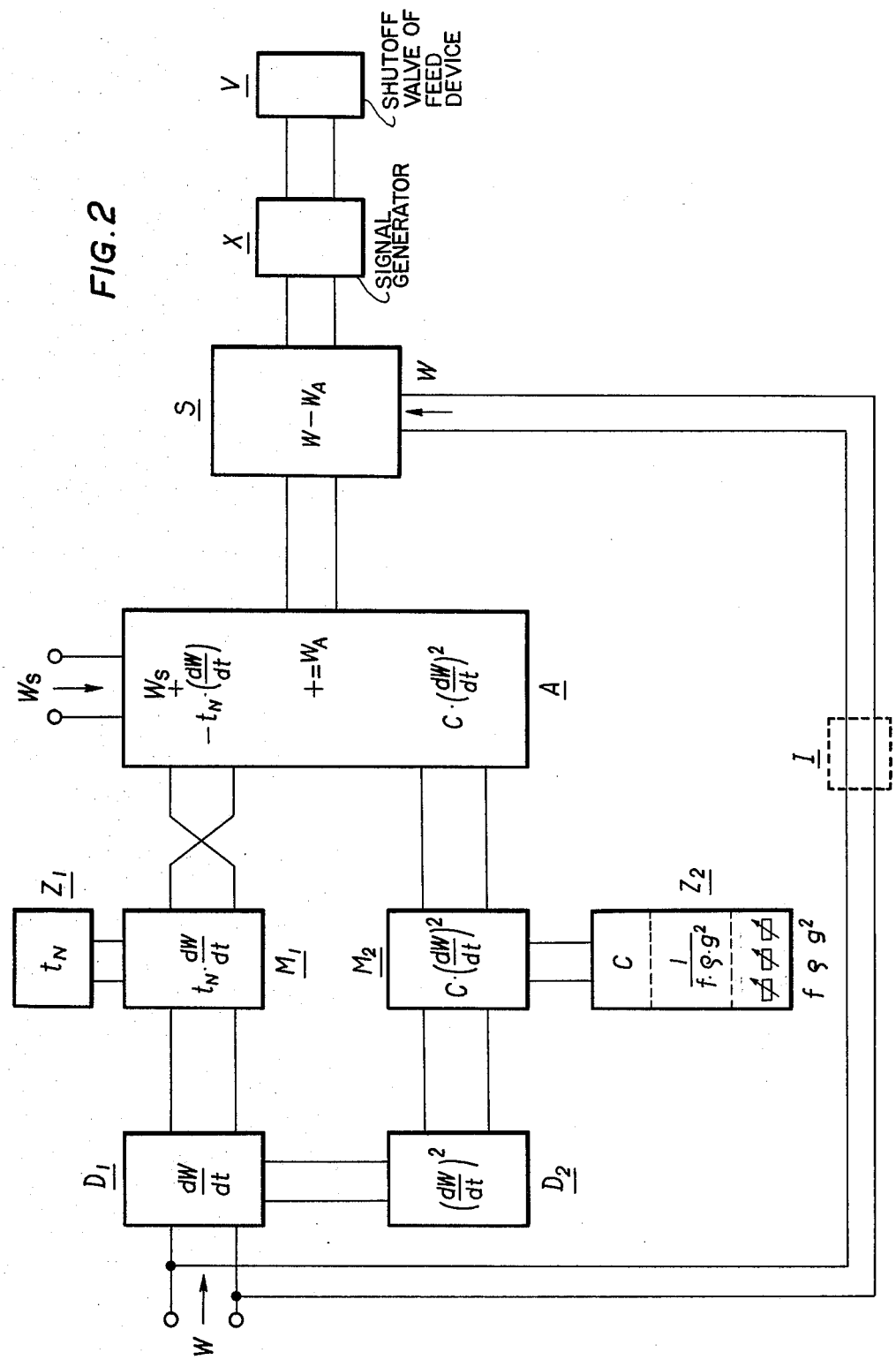
FIG. 2 is a block diagram illustrating an arrangement for carrying out the method.

The invention is also concerned with an arrangement which is used to carry out the method. This arrangement is shown in form of a block diagram in FIG. 2, details being omitted.

The individual components of the arrangement have the purpose of forming the difference quotient ($\Delta W/\Delta t$) or differential quotient ($dW/dt$) of the weighing value, its square or products with the constants C and $t_N$. These constants are fed by means of auxiliary devices $Z_1$ or $Z_2$, or are calculated in the same by feeding in values for the valve cross section $f$ and the density of the pourable material which changes in dependence upon the temperature and moisture. In a further part of the arrangement, the adder A, the algebraic sum $W_s + C(dW/dt)^2 - t_N(dW/dt)$ is formed under inclusion of the intended weighing value $W_s$, and this sum is then used for triggering the operation of the closure device V by a comparison of the intended and actual weighing values.

In some circumstances, it may be advantageous to combine various components of the described arrangement into a structural unit, because of limited space availability or in order to increase the ease of handling and make the arrangement more readily accessible.

Advantageously, the total arrangement will operate with electrical values. The values which are to be preset will than also be electrical values.

It may be that in the event that great weighing accuracy is required, a dribbling operation should additionally be included, where small quantities of material are added until the desired weight value has been reached. It is also advantageous if a signal generator X is constructed to permit manual operation.

It will be understood that each of the elements described above, or two or more together, may also find a useful application in other types of constructions differing from the type described above.

While the invention has been illustrated and described as embodied in a method and apparatus for weighing batches of liquid and other pourable substances, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of controlling the pouring of pourable material into a receptacle comprising, in combination, the steps of using a weigher to measure the downwardly directed force exerted by pourable material contained within and being poured into the receptacle during the actual pouring of such material into the receptacle and generating a corresponding weight-indication signal W; generating a desired-weight signal $W_S$ indicative of the weight of the total amount of pourable material to be poured into the receptacle; applying the signals W and $W_S$ to calculating means operative for generating during the course of the pouring an output signal $W_A$ having a value continually equal to $W_S - t_N(dW/dt) + C(dW/dt)^2$, $t_N$ and C being preselected constants; and during the course of the pouring applying the signals W and $W_A$ to the input of means operative for automatically terminating the further pouring of such material into the receptacle when the signals W and $W_A$ become equal in value.

2. In an apparatus for controlling the pouring of pourable material into a receptacle, in combination, weighing means operative for measuring the downwardly directed force exerted by pourable material contained within and being poured into the receptacle during the actual pouring of such material into the receptacle and generating a corresponding weight-indication signal W; means for generating a desired-weight signal $W_S$ indicative of the weight of the total amount of pourable material to be poured into the receptacle; means for generating an output signal $W_A$ having a value equal to $W_S - t_N(dW/dt) + C(dW/dt)^2$, $t_N$ and C being preselected constants; and means receiving the signals W and $W_A$ and operative for automatically terminating the further pouring of such material into the receptacle when the signals W and $W_A$ become equal in value.

3. In an apparatus as defined in claim 2, wherein the means for generating the output signal $W_A$ includes means $D_1$ for receiving the signal W and generating an output signal $dW/dt$, means $D_2$ for receiving the signal $dW/dt$ and generating an output signal $(dW/dt)^2$, means $M_1$ for receiving the signal $dW/dt$ and generating an output signal $t_N(dW/dt)$, $t_N$ being a constant, means $M_2$ for receiving the signal $(dW/dt)^2$ and generating an output signal $C(dW/dt)^2$, C being a constant, means A for receiving the signals $W_S$, $t_N(dW/dt)$ and $C(dW/dt)^2$, adding $W_S$ to $C(dW/dt)^2$ and subtracting therefrom $t_N(dW/dt)$ to form the output signal $W_A$, and wherein the means for automatically terminating pouring includes means S for receiving the signals W and $W_A$ and forming the difference signal $W-W_A$.

4. In an apparatus as defined in claim 3, wherein at least two of the means $D_1$, $D_2$, $M_1$, $M_2$, A and S are connected together to form a structural unit.

5. In an apparatus as defined in claim 3, wherein the means for generating said signals comprise means for generating the signals in proportion to the physical quantities represented by the signals.

6. In an apparatus as defined in claim 3, wherein said means are components of an analog computer.

7. In an apparatus as defined in claim 6, wherein said analog computer is a direct-current analog computer.

8. In an apparatus as defined in claim 6, wherein said computer is of the type operating with substantially sinusoidal current and voltage values.

9. In an apparatus as defined in claim 6, wherein said computer is of the type operating with voltage or current pulses.

10. In an apparatus as defined in claim 3, wherein at least some of the means for generating said signals comprise means for generating the respective signals in digital form.

11. In an apparatus as defined in claim 3, the apparatus including a valve through which the pourable material discharges into the receptacle, wherein the means for generating the output signal $W_A$ includes means for generating signals $f$, $\rho$ and $g^2$, and means for generating a signal corresponding to the constant C and equal in value to $1/(f \cdot \rho \cdot g^2)$, where $f$ is the cross-section of the valve opening, $\rho$ is the density of the pourable material, and $g$ is the gravitational acceleration constant.

12. In an apparatus as defined in claim 11, wherein the means for generating the signals $f$, $\rho$ and $g^2$ comprise variable resistors.

13. In an apparatus as defined in claim 2, and further including additional means for the metered admission of small quantities of pourable material into the receptacle.

14. In an apparatus as defined in claim 13, the apparatus including a discharge valve through which the pourable material is poured into the receptacle, the additional means for the metered admission of small quantities of pourable material into the receptacle including a signal generator connected intermediate the discharge valve and the means for generating the desired-weight signal $W_S$.

* * * * *